(12) United States Patent
Whipple et al.

(10) Patent No.: US 9,103,365 B2
(45) Date of Patent: Aug. 11, 2015

(54) STRUT-CHANNEL NUT

(71) Applicant: Thomas & Betts International, Inc., Wilmington, DE (US)

(72) Inventors: Charles E. Whipple, Collierville, TN (US); Roger Pyron, Arlington, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 54 days.

(21) Appl. No.: 13/738,600

(22) Filed: Jan. 10, 2013

(65) Prior Publication Data

US 2013/0177366 A1 Jul. 11, 2013

Related U.S. Application Data

(60) Provisional application No. 61/585,374, filed on Jan. 11, 2012.

(51) Int. Cl.
*F16B 27/00* (2006.01)
*F16B 37/00* (2006.01)
*F16B 37/04* (2006.01)

(52) U.S. Cl.
CPC .............. *F16B 37/00* (2013.01); *F16B 37/045* (2013.01)

(58) Field of Classification Search
CPC ............................. F16B 37/00; F16B 37/045
USPC .............................................. 411/84, 85, 172
IPC ..................................................... F16B 37/045
See application file for complete search history.

(56) References Cited

U.S. PATENT DOCUMENTS

| | | | | |
|---|---|---|---|---|
| 2,696,139 | A | * | 12/1954 | Attwood ........................ 411/427 |
| 3,483,910 | A | * | 12/1969 | VanHuffel et al. ............ 411/112 |
| 3,493,025 | A | | 2/1970 | Londe et al. |
| 4,146,074 | A | * | 3/1979 | Kowalski ....................... 411/111 |
| 4,377,360 | A | | 3/1983 | Kennedy |
| 4,410,298 | A | * | 10/1983 | Kowalski ....................... 411/112 |
| 4,460,299 | A | | 7/1984 | Kowalski |
| 4,575,295 | A | * | 3/1986 | Rebentisch ..................... 411/85 |
| 4,784,552 | A | | 11/1988 | Rebentisch |
| 4,840,525 | A | * | 6/1989 | Rebentisch ..................... 411/85 |
| 4,917,553 | A | * | 4/1990 | Muller ............................ 411/85 |
| 5,154,385 | A | | 10/1992 | Lindberg et al. |
| 5,199,836 | A | | 4/1993 | Gogarty |
| 5,655,865 | A | | 8/1997 | Plank et al. |
| 5,820,322 | A | * | 10/1998 | Hermann et al. ............... 411/85 |
| RE36,681 | E | | 5/2000 | Rinderer |
| 6,582,170 | B2 | | 6/2003 | Dinh et al. |
| 6,733,221 | B2 | | 5/2004 | Linger |
| 6,872,038 | B2 | | 3/2005 | Westlake |
| 6,905,297 | B2 | | 6/2005 | DiStasio et al. |

(Continued)

*Primary Examiner* — Gary Estremsky
(74) *Attorney, Agent, or Firm* — Snyder, Clark, Lesch & Chung, LLP (57) ABSTRACT

A nut for a channel of a strut is disclosed. In one embodiment, the length of the nut is greater than the width of the nut. In one embodiment, the first end surface of the nut meets the first side surface at a first rounded corner, and the second end surface meets the second side surface of the nut at a second rounded corner (opposite the first rounded corner). In one embodiment, the first side surface includes a first protrusion at a third corner adjacent the first rounded corner and the second side surface includes a second protrusion at a fourth corner adjacent the second rounded corner. In one embodiment, the first rounded corner and the second rounded corner allow the nut to be rotated in a channel of a strut. In one embodiment, the third corner and the fourth corner disallow further rotation in the channel of the strut.

20 Claims, 11 Drawing Sheets

(56) References Cited

U.S. PATENT DOCUMENTS

| | | |
|---|---|---|
| 7,070,374 B2 * | 7/2006 | Womack et al. .............. 410/104 |
| 7,338,246 B2 | 3/2008 | Caspi |
| 7,594,787 B2 * | 9/2009 | Womack et al. .............. 410/104 |
| 7,604,444 B2 * | 10/2009 | Wu ................................ 411/85 |
| 7,641,429 B2 | 1/2010 | DiStasio et al. |
| 8,100,600 B2 * | 1/2012 | Blum ............................ 403/256 |
| 8,651,786 B2 * | 2/2014 | Merhar et al. .................. 411/84 |
| 8,720,031 B2 * | 5/2014 | Sauer ............................. 29/428 |

* cited by examiner

STRUT-CHANNEL NUT

RELATED APPLICATIONS

This patent application claims priority to and the benefit of U.S. Provisional Patent Application No. 61/585,374, filed Jan. 11, 2012, which is incorporated by reference herein.

BACKGROUND OF THE INVENTION

The present invention relates generally to a nut for insertion into a channel of a strut. As the computer, communications, and energy industries have grown, it is increasingly important to have easy-to-assemble structures to carry computer equipment, cables, etc., for these industries. Often structures made from struts are used to carry such equipment. When a strut is used, often a nut is placed in the channel of the strut to attach other structural components (e.g., another strut, cable hanger, bracket, etc.) to the strut. Struts also often come in different sizes.

DETAILED DESCRIPTION OF THE PREFERRED EMBODIMENTS

Figure 1:
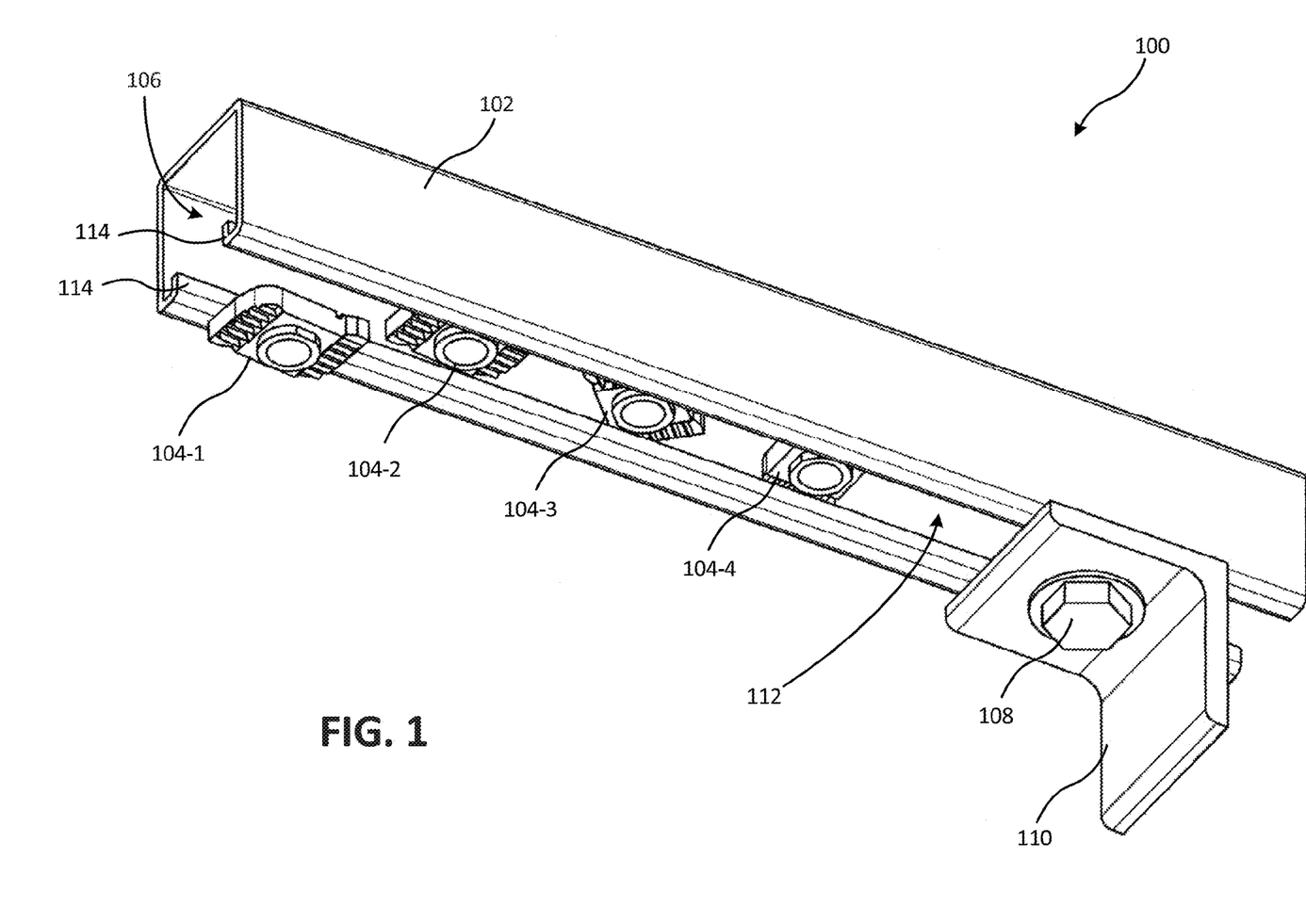
FIG. 1 is an isometric projection drawing of an exemplary strut, channel nut, bolt, and bracket in one configuration.

Computer equipment, cables, or anything requiring support, may be supported by a metal frame comprising struts. When a strut is used, often a nut is placed in the channel of the strut to attach other structural components (e.g., another strut, cable hanger, bracket, etc.) to the strut. FIG. 1 is an isometric projection drawing of an exemplary strut, strut-channel nut, bolt, and bracket in one embodiment. FIG. 1 shows a strut 102 relative to a nut 104 in four positions (e.g., nut 104-1 in position 1, nut 104-2 in position 2, nut 104-3 in position 3, and nut 104-4 in position 4). Strut 102 includes an opening 112 to a channel 106 through strut 102. Nut 104 is shown four tunes as it is being inserted into channel 106, rotated, and ultimately coupled with a bolt 108 to secure a bracket 110 to strut 102.

In its first position, nut 104-1 is situated under strut 102 so that nut 104-1 can be placed into opening 112 of strut 102. In its second position, nut 104-2 is situated in channel 106 of strut 102. In its third position, nut 104-3 has been rotated approximately forty-five degrees (e.g., relative to the position of nut 104-2) so that nut 104-3 can begin to rest on internal flanges 114 of strut 102. In its fourth position, nut 104-4 has been rotated approximately ninety degrees (e.g., relative to the position of nut 104-2) so that nut 104-4 may fully rest on internal flanges 114 of strut 102.

In the fourth position, nut 104-1 may receive bolt 108 that secures bracket 110, 104, and bolt 108 to strut 102. In one embodiment, as described below, teeth on nut 104 may help prevent nut 104 from sliding along the length of strut 102. Further, the geometric shape of nut 104 may prevent nut 104 from rotating much beyond the position shown by nut 104-4 (e.g., relative to the position of nut 104-2). As discussed below, nut 104 may be well suited for multiple size struts. Strut 102 and nut 104 are described in detail below with respect to FIGS. 2A, 2B, 3A, and 3B.

Figure 2A:
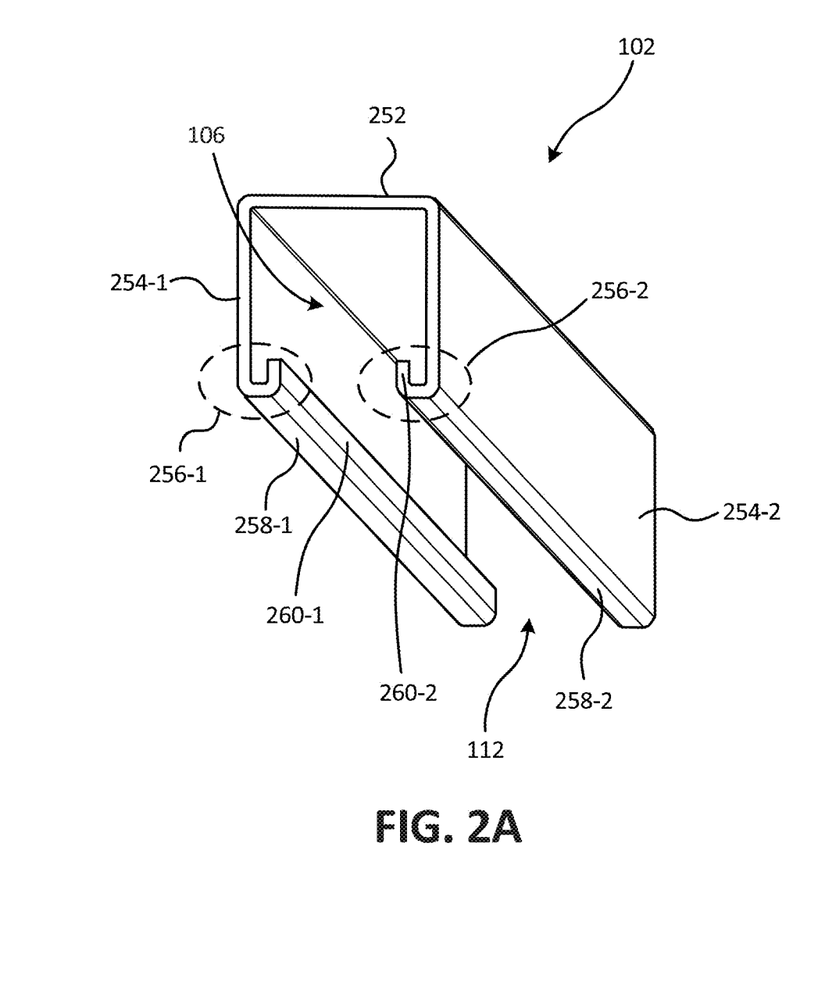
FIG. 2A is an isometric projection drawing of the exemplary strut of FIG. 1.
Figure 2B:
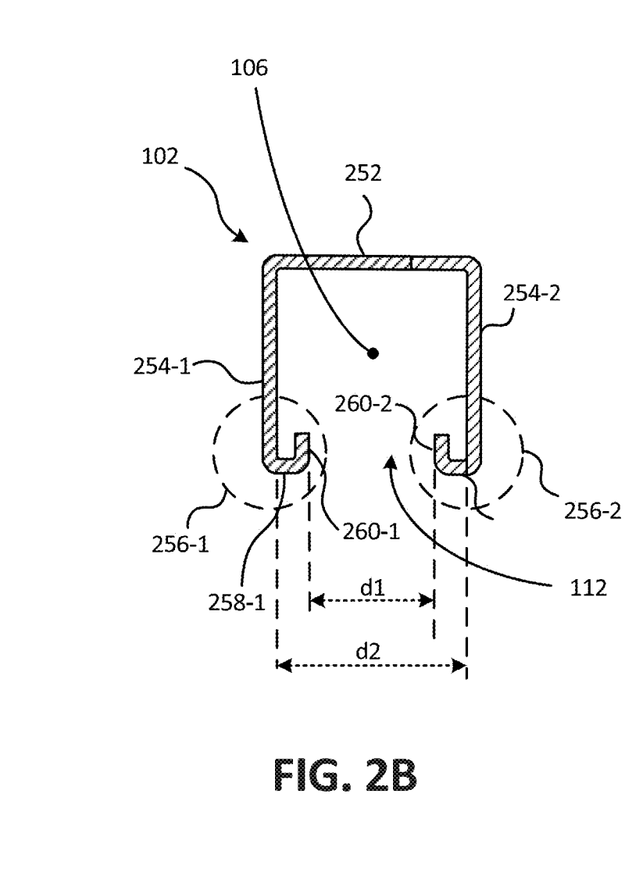
FIG. 2B is a cross-sectional drawing of the exemplary strut of FIG. 1.

FIG. 2A is an isometric projection drawing of strut 102 and FIG. 2B is a cross-sectional drawing of strut 102. Strut 102 may include a top portion 252, a first leg 254-1 and a second leg 254-2 (collectively, legs 254), and a first flange 256-1 and a second flange 256-2 (collectively, flanges 256). First flange 256-1 may include a first inwardly projecting portion 258-1 and a first upwardly projecting portion 260-1. Likewise second flange 256-2 may include a second inwardly projecting portion 258-2 and a second upwardly projecting portion 260-2.

As shown to FIG. 2B and described above, strut 102 has an opening 112 through which nut 102 may pass. Opening 112 has an opening width of d1 between first upwardly projection portion 260-1 and second upwardly projecting portion 260-2. Further, channel 106 has a channel width of d2 from the inner wall of first leg 254-1 to the inner wall of second leg 254-2.

Figure 3A:
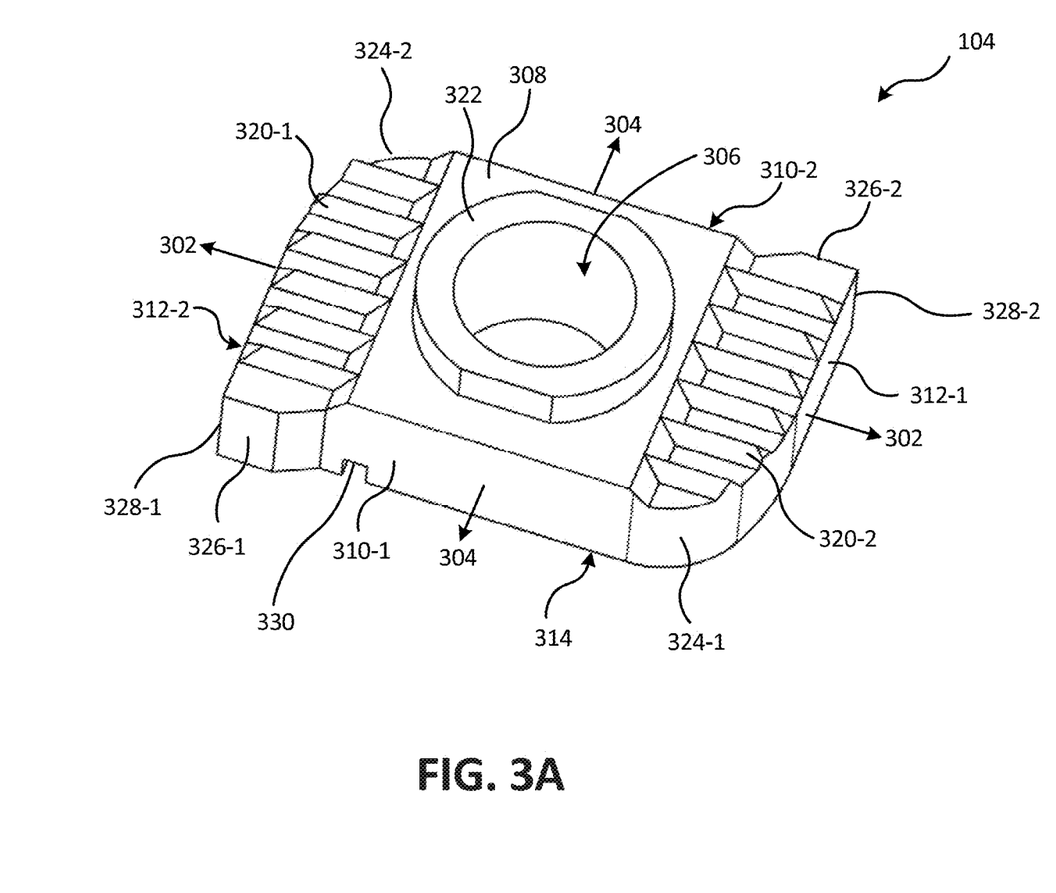
FIG. 3A is an isometric projection drawing of the exemplary channel nut of FIG. 1.
Figure 3B:
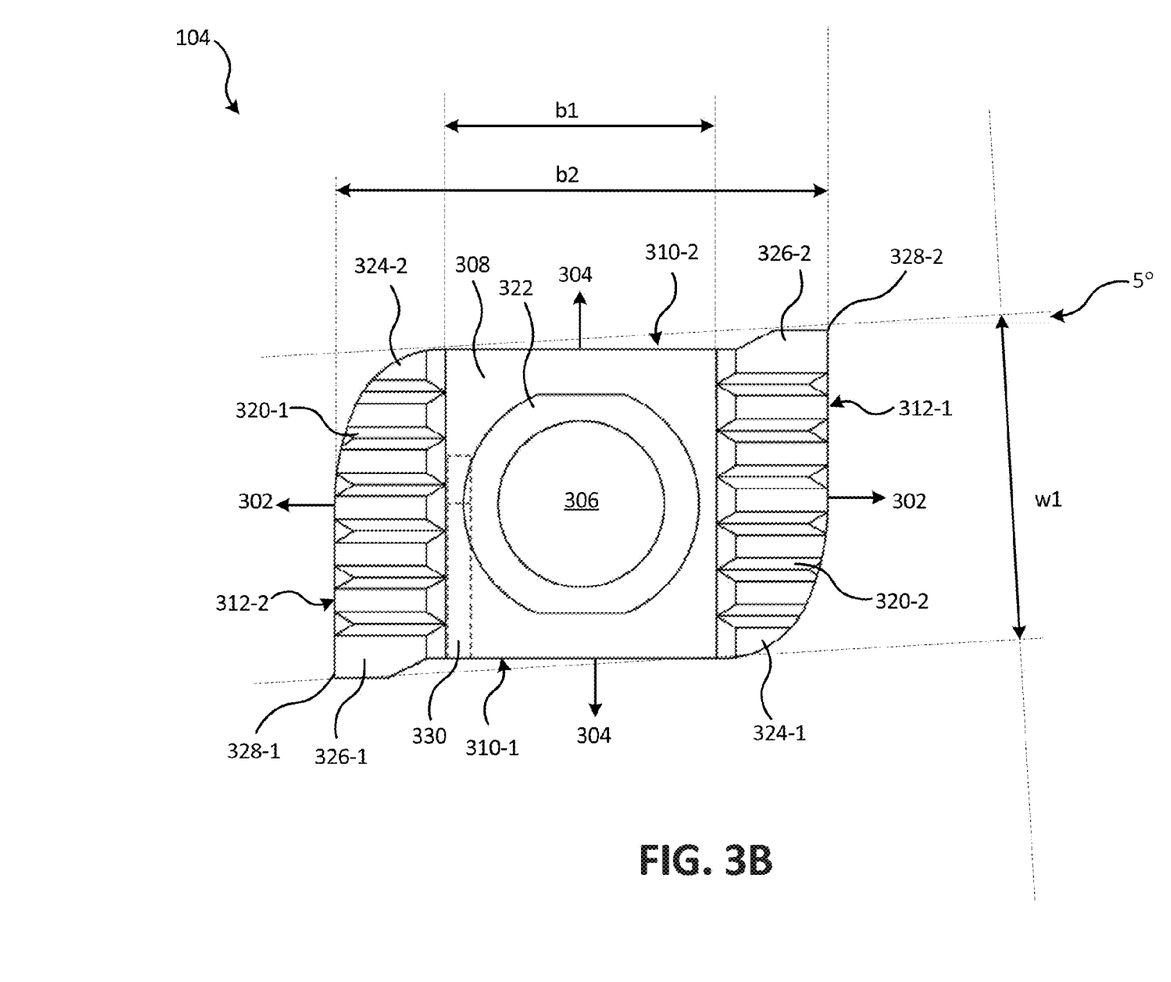
FIG. 3B is a drawing of the exemplary channel nut of FIG. 1 viewed from the top.

FIG. 3A is an isometric projection drawing of channel nut 104 and FIG. 3B is a drawing of channel nut 104 viewed from the top. Nut 104 includes a major axis 302 and a minor axis 304. As shown in FIG. 3A, nut 104 includes a first face 308, a first side surface 310-1, and a first end surface 312-1. Hidden from view in FIG. 3A, nut 104 also includes a second face 314, a second side surface 310-2, and a second end surface 312-2. A hole 306 passes through nut 104 from first face 308 to second face 314. In one embodiment, hole 306 is threaded to receive bolt 108, for example, to secure nut 104 to, for example, bracket 110 and strut 102.

First face 308 includes a first set of teeth 320-1 and a second set of teeth 320-2 (collectively teeth 320). Teeth 320 may engage with upwardly projecting portions 260 of flanges 256 to help secure nut 104 to strut 102. For example, teeth 320 may increase the friction between nut 104 and strut 102 so that nut 104 does not slide through the length of channel 106 when nut 104 is secured to strut 102 (e.g., via a clamping relationship with bracket 110 and bolt 108). In one embodiment, teeth 320 may extend from hole 306 to end surfaces 312 of nut 104 (e.g., extending from a tangent of hole 306 parallel to minor axis 304 to end surfaces 312). In another embodiment, nut 104 includes a ridge 322 surrounding hole 306. In this embodiment, teeth 320 may extend from ridge 322 to end surfaces 312 (e.g., extending from a tangent of ridge 322 parallel to minor axis 304 to end surfaces 312). Ridge 322, as described in more detail below, may receive a cone for holding nut 104 to strut 102 before coupling bolt 108 to nut 104. In yet another embodiment, hole 306 may include a recess (not shown) surrounding hole 306. The recess, as described in more detail below, may also receive a cone for holding nut 104 to strut 102 before coupling bolt 108 to nut 104. In this embodiment, teeth 320 may extend from the recess to end surfaces 312 of nut 104 (e.g., extending from a tangent of the recess parallel to minor axis 304 to end surfaces 312). In one embodiment, surface 308 may be substantially covered with teeth 320. In one embodiment, teeth 320 may extend to the edge of surface 308 for the entire length of surfaces 312. This embodiment may allow for nut 104 to accommodate struts of different sizes (e.g., different spacing between upwardly projecting portions 260).

Figure 4:
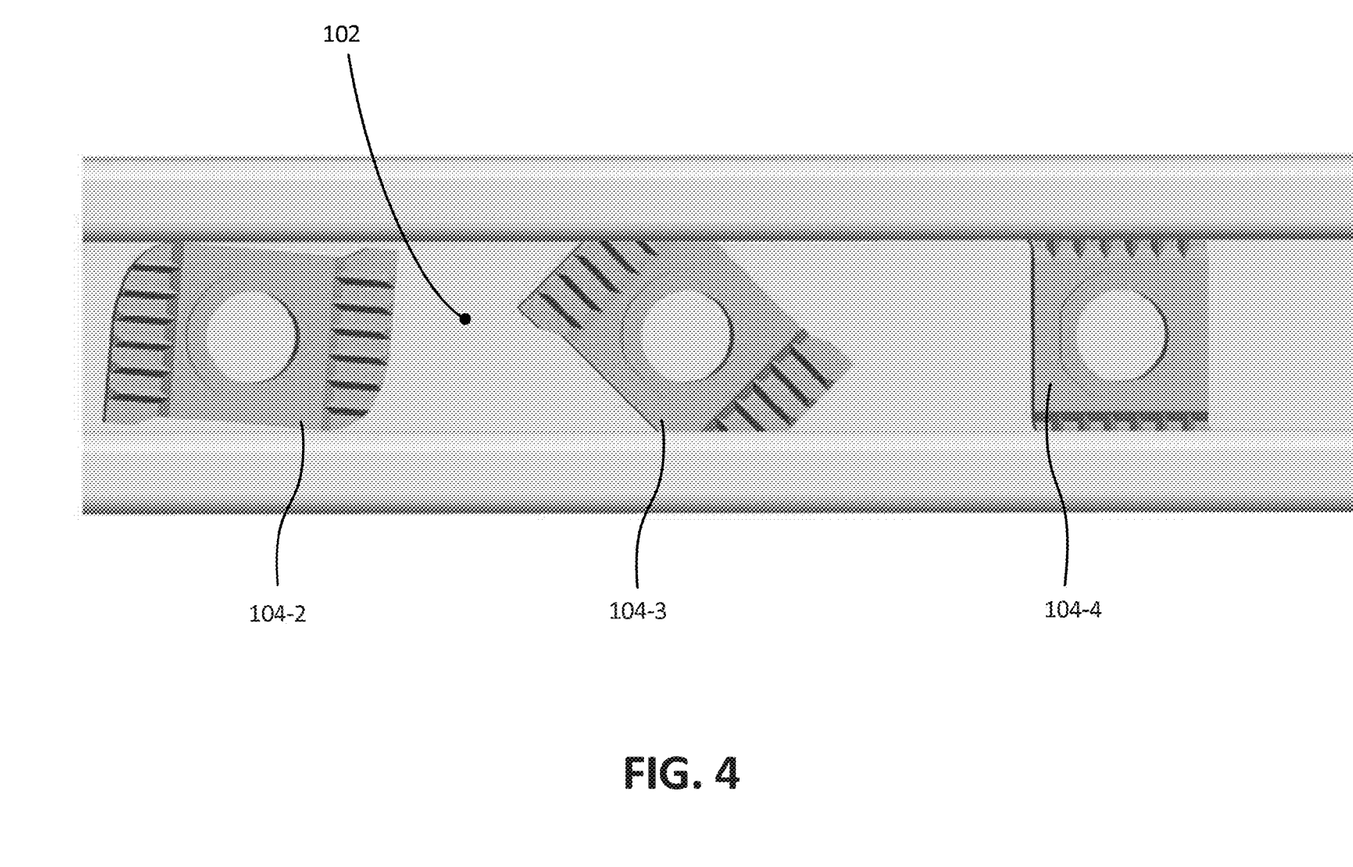
FIG. 4 is a drawing of the channel nut of FIG. 1 being inserted into and rotated in the strut of FIG. 1.

As mentioned above with respect to FIG. 1, nut 104 may be inserted into strut 102 and rotated for securing nut 104 to strut 102. FIG. 4 shows nut 104 in positions 2, 3, and 4, as described above with respect to FIG. 1. In one embodiment, nut 104-2 has a width that is narrow enough (e.g., narrower than opening width d1) to be inserted into opening 112. For example, as shown in FIG. 3A, nut 104 has a width w1 that is less than opening width d1 of strut 102. In this example, width w1 extends along face 308 from first side surface 310-1 to second side surface 310-2. In one embodiment, nut 104 is rotated slightly (e.g., such that major axis 302 is approximately five degrees separated from the major axis of strut 102) to fit nut 104 into opening 112. In this way, nut 104 may be inserted into strut 102 while face 308 of nut 104 is parallel with the surface of top portion 252. Put another way, nut may be inserted into strut 102 while face 308 is parallel with the surface formed between upwardly projecting portions 260.

As shown in FIG. 4, once nut 104 is inserted into strut 102, nut 104 may be rotated to position 2. As shown in FIGS. 3A, 3B, and 4, nut 104 includes opposite rounded corners 324. A first rounded corner 324-1 extends between first side surface 310-1 and first end surface 312-1. A second rounded corner 324-2 (e.g., opposite first rounded corner 3244) extends between second side surface 3102 and second end surface 312-2. Rounded corners 324 allow nut 104 to continue to be rotated from position 2 to positions 3 and 4 (e.g., a total of 90 degrees from position 2). That is, the distance from first rounded corner 324-1 to second rounded corner 324-2 is less than channel width d2.

In one embodiment, once in position 4, nut 104 may be prevented from further rotation. As shown in FIGS. 3A, 3B, and 4, nut 104 includes projections 326 on opposite corners. A first projection 326-1 projects outward from first side surface 310-1 and extends second end surface 312-2. A second projection 326-2 projects outward from second side surface 310-2 and extends first end surface 312-1. Projections 326 prevent nut 104 from continuing to be rotated much beyond position 4 (e.g., in the clockwise direction shown in FIG. 4). That is, the distance from a corner 328-1 of first projection 326-1 to a corner 328-2 of second projection 326-2 is greater than channel width d2.

Figure 5:
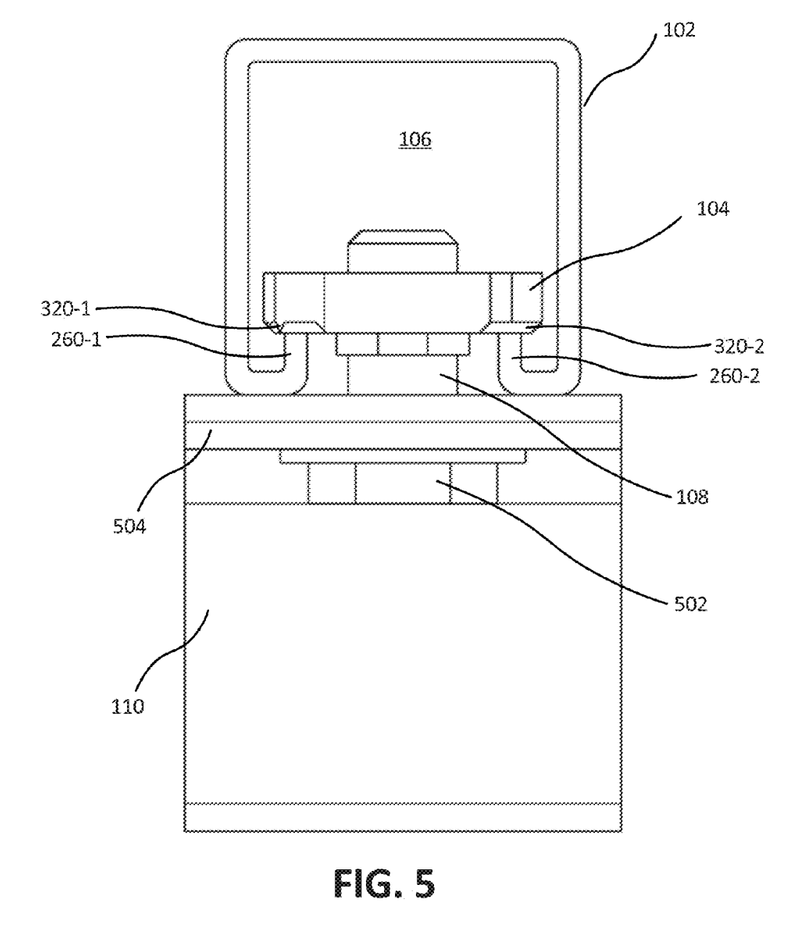
FIG. 5 is a drawing of the strut, bolt, bracket, and channel nut of FIG. 1, where the bracket is secured to the strut by the nut and the bolt as viewed from the end of the strut.

FIG. 5 is an end view of strut 102, nut 104, bolt 108, and bracket 110 looking into channel 106. As shown in FIG. 5, bolt 108 is coupled to nut 104. The force between the threads of bolt 108 and nut 104 pulls nut 104 toward a head 502 of bolt 108 and head 502 of bolt toward nut 104. Nut 104 is opposed by strut 102 (e.g., upwardly projecting portions 260). Bolt 108 is opposed by a base portion 504 of bracket 110. In turn, strut 102 and bracket 110 are also in contact with and oppose each other. Teeth 320 engage upwardly projecting portions 260 and enhance the friction between the two. Thus, teeth 320 help prevent nut 104 from sliding through channel 106 along upwardly projecting portions 260. In this manner, bolt 108 and nut 104 secure bracket 110 to strut 102.

Figure 6:
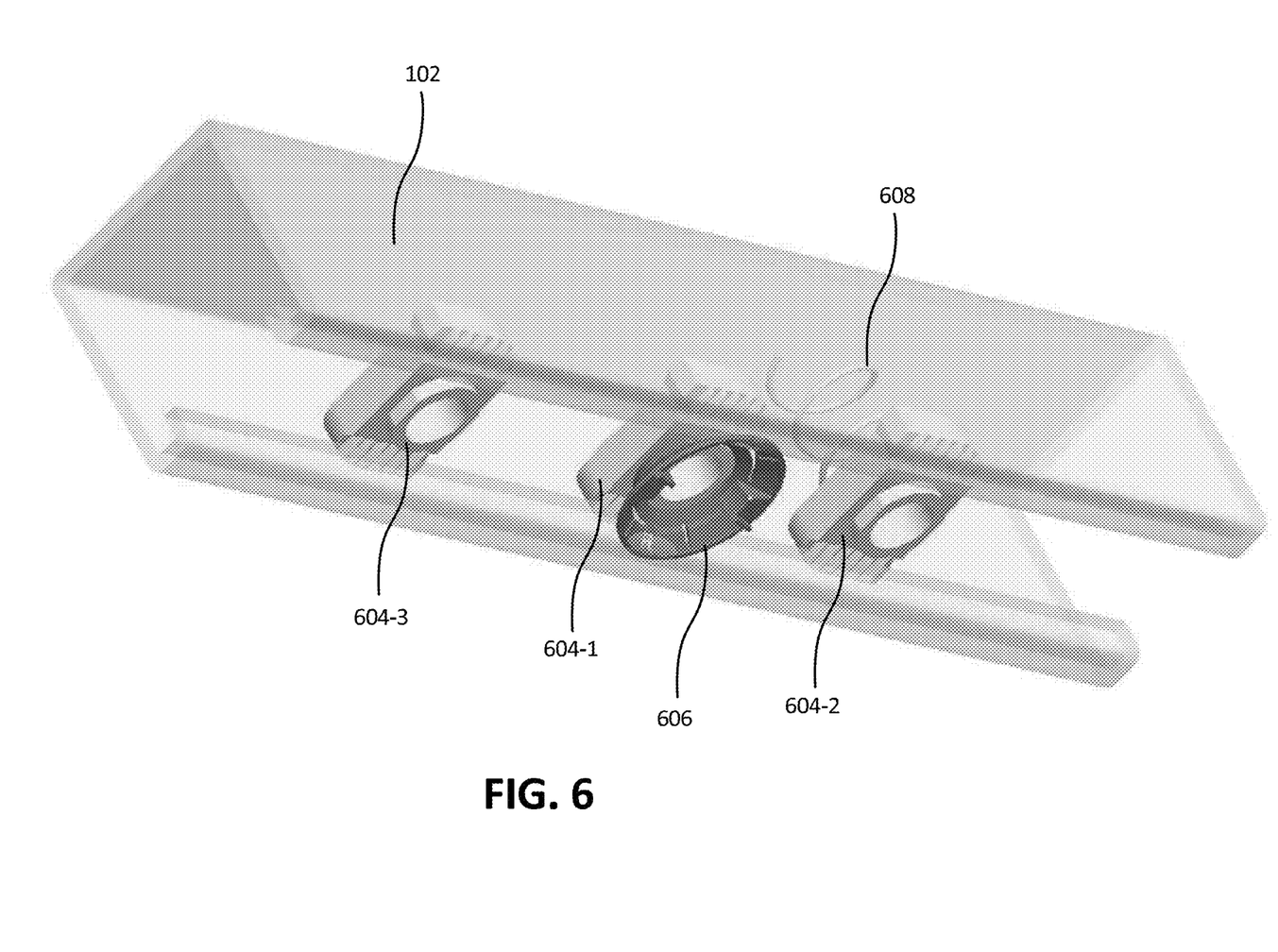
FIG. 6 is a isometric projection drawing of one channel nut held in place in a strut with magnetism, another channel nut held in place in the strut with a cone, and yet another channel nut held in place in the strut with a spring.

FIG. 6 is an isometric projection drawing of three instances of a nut 604 (e.g., nut 604-1, nut 604-2, and nut 604-3) in strut 102. Nut 604 may be configured similarly to nut 104 described above. Nut 604 may also be configured similarly to nut 802 described below with respect to FIGS. 8A and 8B. FIG. 6 illustrates three ways of holding nut 604 to strut 102 before a bolt (e.g., bolt 108) is coupled to nut 604 to secure it to strut 102. In one instance, nut 604-1 is coupled to a cone 606 to hold nut 604-1 to strut 102. In another instance, nut 604-2 is coupled to a spring 608 to hold nut 604-2 to strut 102. In another instance, nut 604-3 is held in place with respect to strut 102 by an electromagnetic force (e.g., a magnet). These three examples are described below with respect to FIGS. 7A through 7C.

Figures 7A, 7B, 7C:
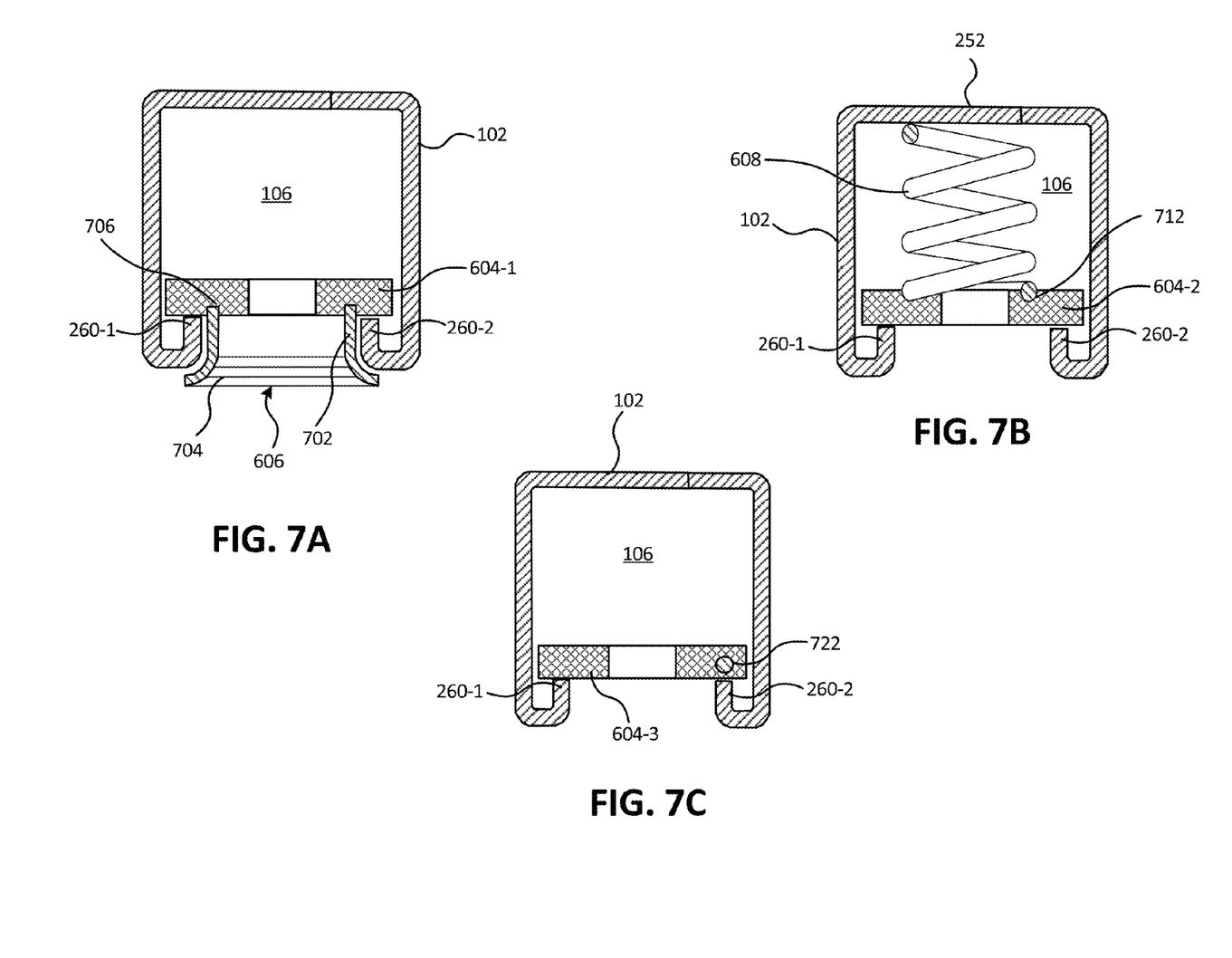
FIG. 7A is a cross-sectional drawing of the strut and one of the channel nuts of FIG. 6, where the channel nut is held in place in the strut with a cone.
FIG. 7B is a cross-sectional drawing of the strut and one of the channel nuts of FIG. 6, where the channel nut is held in place with a spring.
FIG. 7C is a cross-sectional drawing of the strut and one of the channel nuts of FIG. 6, where the Channel nut is held in place with magnetism.

FIG. 7A is a cross-sectional drawing of channel nut 604-1, strut 102, and cone 606 of FIG. 6, in which channel nut 604-1 is held in place by cone 606. As shown FIG. 7A, cone 606 includes a cylindrical portion 702 and a flared portion 704. The outer diameter of cylindrical portion 702 is smaller than channel opening width d1. Flared portion 704, on the other hand, has a diameter that is larger than channel opening width d1. As shown in FIG. 7A, cylindrical portion 702 may fit (e.g., a friction fit) into a cylindrical recess 706 on the surface of nut 604-1. As such, cone 606 prevents nut 604-1 from falling away from upward projecting portions 260 of strut 102. In another embodiment, cylindrical portion 702 may it (e.g., a friction fit) around a ridge protruding from nut 604-2 (e.g., similar to ridge 322 shown in FIG. 3A). Cone 606 may be placed on the face of nut 604-1 and may accompany nut 6041 through opening 112 of strut 102. An operator may turn it 604-1 inside channel 106 (accompanied with cone 606) so that cone 606 holds nut 604-1 to strut 102. In one embodiment, friction between flared portion 704 and strut 102 may help prevent nut 604-1 from rotating without the operator input.

FIG. 7B is a cross-sectional drawing of channel nut 604-2, strut 102, and spring 608 of FIG. 6, in which channel nut 604 is held in place with spring 608. As shown, spring 608 engages the back of nut 604-2 and the top portion 252 of strut 102. Spring 108 may be compressed such that it applies a force to the back of nut 604-2, pressing nut 604-2 against upward projecting portions 260 of strut 102. In this way, nut 604-2 may be held in place until an operator couples a bolt (e.g., bolt 108) to nut 604-2. Spring 608 may fit (e.g., a friction fit) into a cylindrical recess 712 on the surface of nut 604-2. In another embodiment, spring 608 may fit (e.g., a friction fit) around a ridge protruding from nut 604-2 rather than or in addition to recess 712. In another embodiment, spring 608 may fit (e.g., a friction fit) into a recess 330 (see FIGS. 3A and 3B) of nut 104. In these embodiments, the outer diameter of spring 608 may be smaller than channel opening width d1. In this way, spring 608 may be placed on the back of nut 604-2 and may accompany nut 604-2 through opening 112 of strut 102.

FIG. 7C is a cross-sectional drawing of channel nut 604-3 and strut 102 of FIG. 6, in which channel nut 604-3 is held in place by a magnetic force acting on nut 604-3 and strut 102. In this embodiment, nut 604-3 may be magnetized and strut 102 may be made of a ferromagnetic material, such as iron. In one embodiment, nut 604-3 may be or include a permanent magnet 722 that is embedded into nut 604-3. In another embodiment, nut 604-3 may become magnetized by passing nut 604-3 through a magnetic field. The magnetism and the resulting force prevents nut 604-3 from falling away from upward projecting portions 260 of strut 102 until an operator, for example, attaches a bolt (e.g., bolt 108).

Figure 8A:
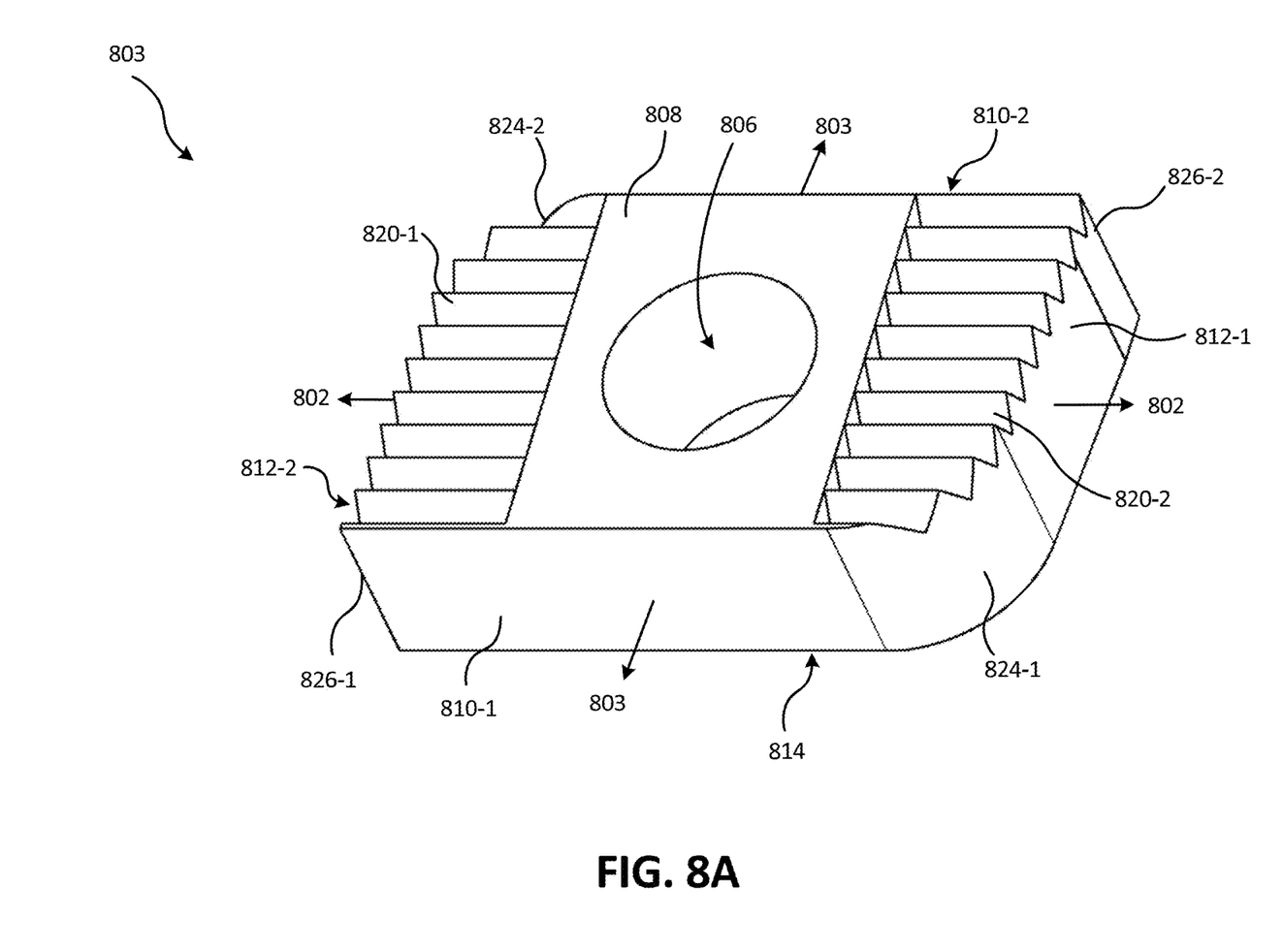
FIG. 8A is an isometric projection drawing of an exemplary channel nut in another embodiment.
Figure 8B:
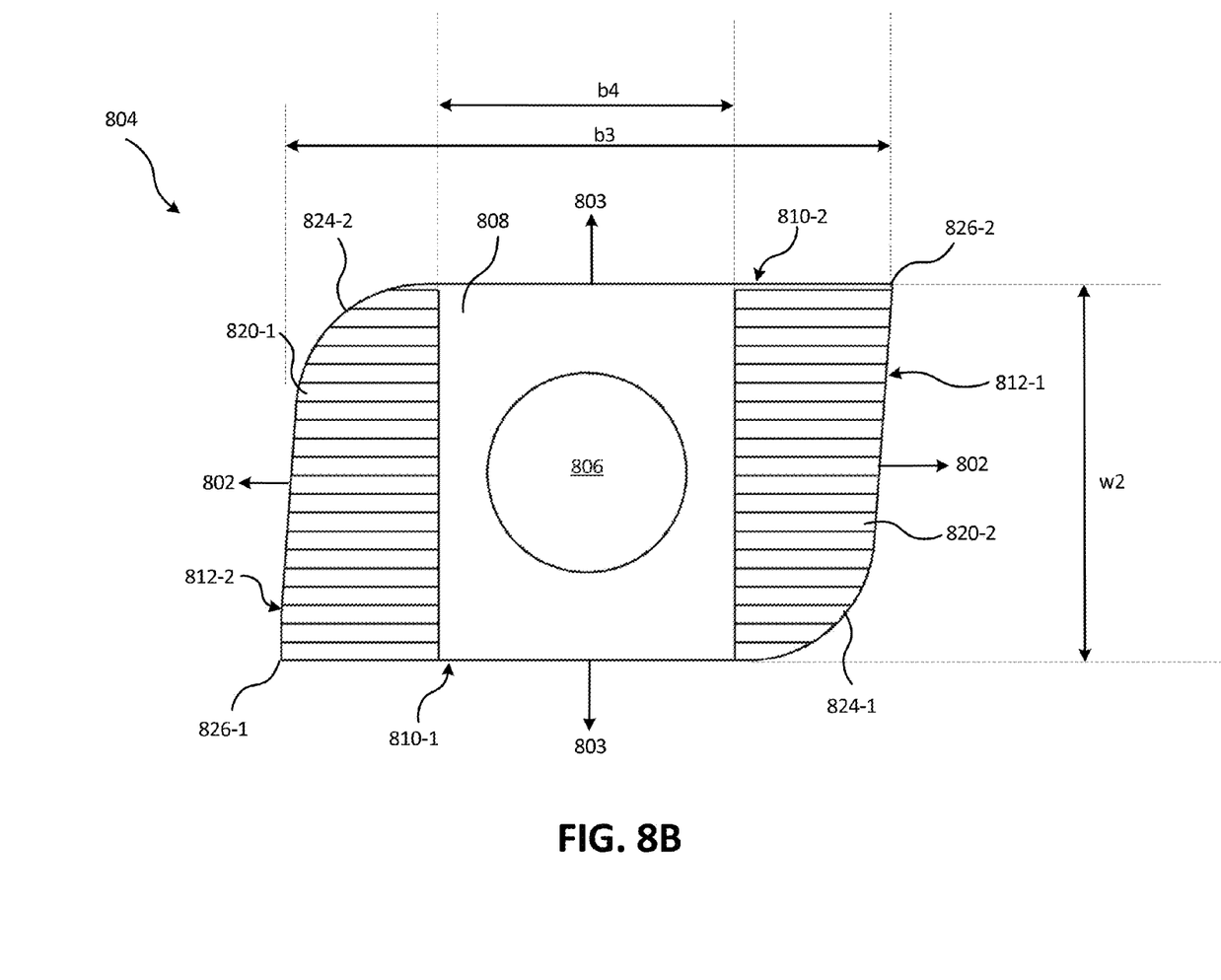
FIG. 8B is a drawing of the exemplary channel nut of FIG. 8A viewed from the top.

FIG. 8A is an isometric projection drawing of a channel nut 804 and FIG. 8B is a drawing of channel nut 804 from the top in another embodiment. Nut 804 includes a major axis 802 and a minor axis 803. As shown in FIG. 3A, nut 804 includes a first face 808, a first side surface 810-1, and a first end surface 812-1. Hidden from view in FIG. 8A, nut 804 also includes a second face 814, a second side surface 81062, and a second end surface 8122. A hole 806 passes through nut 804 from top surface 808 to bottom surface 814. In one embodiment, hole 806 is threaded to match and receive threads on a bolt (e.g., bolt 108), for example, to secure nut 804 to strut 102.

First face 808 includes a first set of teeth 820-1 and a second set of teeth 820-2 (collectively teeth 820). Teeth 820 may engage with upwardly projecting portions 260 of flanges 256 to help secure nut 804 to strut 102. For example, teeth 820 may increase the friction between nut 804 and strut 102 so that nut 804 does not slide through channel 106 when nut 804 is secured to strut 102. In one embodiment, teeth 820 may begin at hole 806 and end at end surfaces 812 of nut 804 (e.g., extend between tangents of hole 806 parallel to minor axis 803 and extend to end surfaces 812). In another embodiment, hole 806 may include a ridge (e.g., similar ridge 322) surrounding hole 806. In this embodiment, teeth 820 may extend from the ridge (or tangents of the ridge) to end surfaces 812 of nut 804. In yet another embodiment, hole 806 may include a recess (not shown) surrounding hole 806. The recess, as described above, may receive cone 606 for securing nut 804 to strut 102. In this embodiment, teeth 820 may begin at the recess tangents of the ridge) and extend to the end surfaces 812 of nut 804. In one embodiment, teeth 820 may cover substantially all of first face 808 of nut 804. In one embodiment, teeth 820 may extend to the edge of surface 808 for the entire length of surfaces 812. This embodiment may allow for nut 804 to accommodate struts of different sizes (e.g., different spacing between upwardly projecting portions 260).

Similar to nut 104, nut 804 may be inserted into strut 102 and rotated for securing nut 804 to strut 102. Nut 804 includes a width w2 that is narrow enough to be inserted into opening 112 (e.g., narrower than opening width d1). In this example, width w2 extends along face 808 from first side surface 810-1 to second side surface 810-2. In this way, nut 104 may be inserted into strut 102 while face 808 of nut 804 is parallel with the surface of top portion 252. Put another way, nut may be inserted into strut 102 while face 808 is parallel with the surface formed between upwardly projecting portions 260. In this embodiment, nut 804 does not have to be rotated slightly to enter opening 112 because nut 804 does not include projections 326.

Once nut 804 is inserted into strut 102, nut 804 may be rotated such that teeth 820 engage upwardly projecting portions 260 of strut 102. Like nut 104, nut 804 includes opposite rounded corners 824. A first rounded corner 824-1 extends between first side surface 810-1 and first end surface 812-1. A second rounded corner 824-2 extends between second side surface 810-2 and second end surface 812-2. Rounded corners 824 may allow nut 804 to continue to be rotated until major axis 802 is perpendicular (or substantially perpendicular) to the major axis of strut 102. That is, the distance from first rounded corner 824-1 to second rounded corner 824-2 is less than channel width d2.

As with nut 104, nut 804 may be prevented from further rotation. As shown in FIGS. 8A and 8B, nut 804 includes opposite angled corners 826. A first corner 826-1 exists between first side surface 810-1 and second end surface 812-2. A second corner 826-2 exists between second side surface 810-2 and first end surface 812-1. As better seen in FIG. 8B, first end surface 812-1 extends away from minor axis 803 of nut 804 (passing through the center of hole 806) as surface 812-1 approaches angled corner 826-2. Further, second end surface 812-2 extends away from minor axis 803 of nut 804 (passing through the center of hole 806) as second end surface 812-1 approaches angled corner 826-2, Corners 326 prevent nut 804 from continuing to be rotated much beyond the position where major axis 802 is perpendicular to the major axis of strut 102. That is, the distance from first corner 826-1 to second corner 826-2 is greater than channel width d2.

Figure 9:
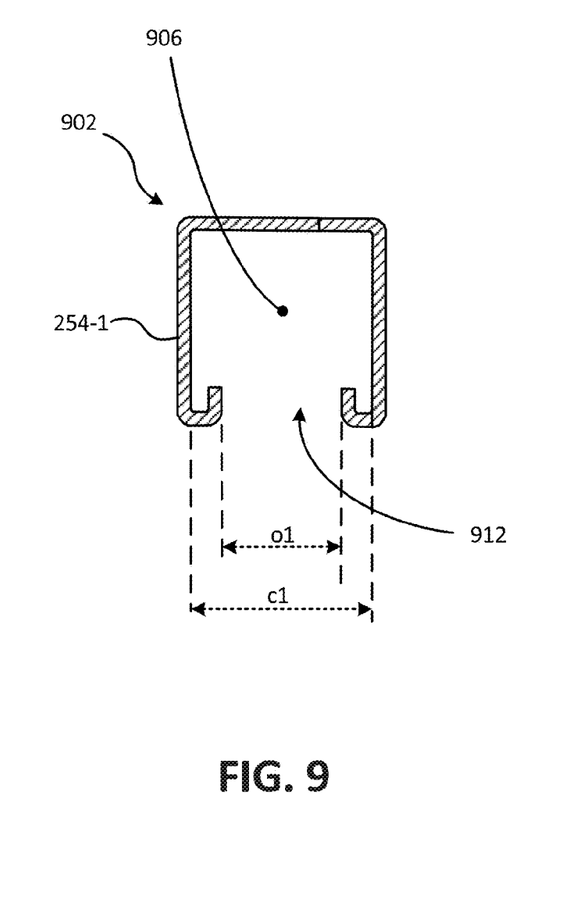
FIGS. 9 and 10 are cross-sectional drawings of two struts of different sizes compatible with the channel nuts described herein.
Figure 10:
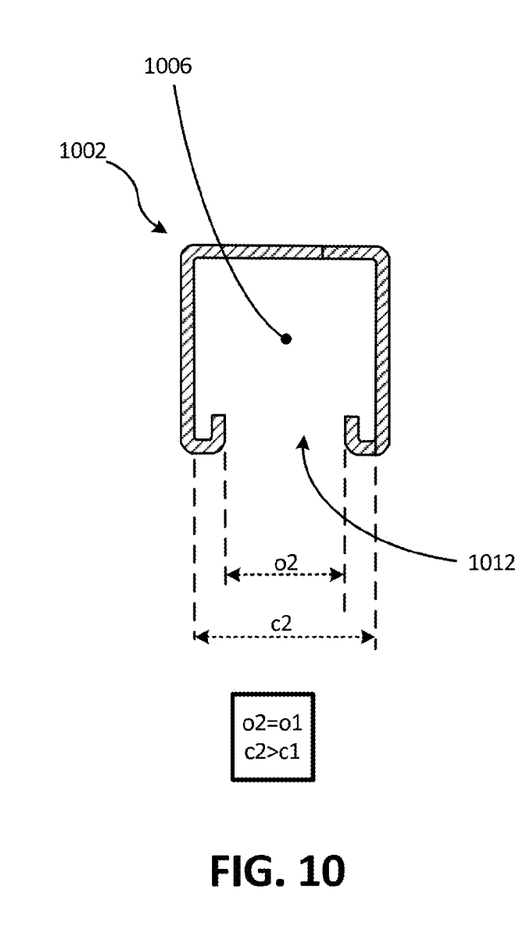

As mentioned above, nuts disclosed herein (e.g., nut 104 and/or nut 804) may be used for struts of various sizes. FIGS. 9 and 10 show two struts of two different sizes. FIG. 9 is a cross-sectional drawing of a strut 902 and FIG. 10 is a cross-sectional drawing of a strut 1002. Strut 902 includes an opening 912 to a channel 906 and strut 1002 has an opening 1012 to a channel 1006. Strut 902 has an opening 912 width of o1 and a channel 906 width of c1. Strut 1002 has an opening 1012 width of o2 and a channel 1006 width of c2. In this example, o2=o1 and c2>c1. For a nut to fit both struts (while maintaining the feature of locking when rotated), the following may be design criteria: (1) the minimum width of the nut (e.g., w1 or w2) should be less than opening width o1 and o2 so that the nut can pass through both openings 912 and 1012; (2) the length of the nut from every point on the rounded corner (e.g. rounded corner 324-2 or 824-2) to a corresponding point on the opposite rounded corner (e.g., rounded corner 324-1 or 824-1) should be less than channel width c1 of smaller strut 902 so that the nut can be rotated (e.g., approximately 90 degrees) after being inserted into strut 902 and strut 1002; (3) the length of the nut from one end surface (e.g., end surface 312-2 or 812-2) to a corresponding point on the other end surface (e.g., end surface 312-1 or 812-1) should be less than channel width c1 of smaller strut 902 so that the nut may be rotated (e.g., approximately 90 degrees) after being inserted into strut 902 and strut 1002; (4) the length of the nut from the non-rounded corner (e.g., corner 328-2 or corner 826-2) to the opposite non-rounded corner (e.g., corner 328-1 to corner 826-2) should be greater than channel width c2 of larger strut 1002 so that the nut will lock when rotated in both struts 902 and 1002; (5) the distance between the start of the teeth (e.g., a distance b1 shown in FIG. 3B and a distance b3 shown in FIG. 8B) should be less than opening width o1 and o2; (6) the distance between the end of the teeth (e.g., a distance b2 shown in FIG. 3B and a distance b3 shown in FIG. 8B) should be greater than the opening width o1 and o2. In one embodiment, extending the teeth to the end surfaces 312 and 812 help achieve the last two criteria. The design of nuts 104 and 804, for example, meet these design criteria. Other design criteria are possible. In one embodiment, opening widths o1 and o2 are 0.875 inches, channel width c2 is 1⅝ inches, and channel width c1 is 1½ inches. In one embodiment, extending the teeth to end surfaces 312 or 812 allows for accommodation of different opening widths for struts while still allowing the strut to engage the teeth.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments. Although terms such as "front," "rear," "forward," "backward," "top," "bottom," "left," "right," "up," "down," "under," and "over" are used, these terms are used for convenience to show elements in the figures relative to each other. These terms are not used to indicate absolute direction or position. As such, the terms "rear" and "front" may be interchanged, "top" and "bottom" may interchanged, etc.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a nut having a first face and a second face with a hole passing from the first face through the nut to the second face,
      wherein the nut includes a length along the first face and the second face and a width along the first face and the second face, the length being greater than the width,
      wherein the nut includes a first end surface and a second end surface at ends of the length, and wherein the nut includes a first side surface and a second side surface at ends of the width,
      wherein the first end surface meets the first side surface at a first rounded corner, and wherein the second end surface meets the second side surface at a second rounded corner, wherein the first rounded corner is opposite the second rounded corner,
      wherein the first side surface includes a first protrusion at a third corner adjacent the first rounded corner, wherein the first protrusion protrudes from the first side surface in a direction normal to the first side surface,
      wherein the second side surface includes a second protrusion at a fourth corner adjacent the second rounded corner, wherein the second protrusion protrudes from the second side surface in a direction normal to the second side surface, and wherein the third corner is opposite the fourth corner, and
      wherein the first rounded corner and the second rounded corner allow the nut to be rotated in a channel of a strut, and wherein the third corner and the fourth corner disallow prevent further rotation in the channel of the strut by virtue of a distance between the first protrusion at the third corner and the second protrusion at the fourth corner being greater than a channel width of the channel defined by a first wall and a second wall of the strut.

2. The system of claim 1, further comprising:
   teeth on the first face of the nut, wherein the teeth extend to the first end surface and the second end surface, wherein the teeth are configured to engage a flange of the strut.

3. The system of claim 1, wherein the strut is a first strut, the system further comprising:
   the first strut, wherein the first strut has a first channel opening to a first channel, wherein the first channel opening has a first opening width and the first channel has a first channel width, wherein the third corner and the fourth corner prevent further rotation in the first channel of the first strut by virtue of the first protrusion at the third corner and the second protrusion at the fourth corner contacting the first wall and the second wall of the first strut.

4. The system of claim 3, further comprising:
   a second strut having a second channel opening to a second channel, wherein the second channel opening has a second opening width and the second channel has a second channel width,
   wherein the second opening width is greater than the first opening width or the second channel width is greater than the first channel width,
   wherein the first rounded corner and the second rounded corner allow the nut to be rotated in the second channel of the second strut, and wherein the third corner and the fourth corner prevent further rotation in the second channel of the second strut by virtue of the distance between the first protrusion at the third corner and the second protrusion at the fourth corner being greater than the second channel width defined by a first wall and a second wall of the second strut, and by virtue of the first protrusion at the third corner and the second protrusion at the fourth corner contacting the first wall and the second wall of the second channel of the second strut.

5. The system of claim 3, further comprising:
   teeth on the first face of the nut, wherein the teeth extend to the first end surface and the second end surface,
   wherein the teeth are configured to engage a flange of the first strut and a flange of the second strut, and
   wherein the second opening width is greater than the first opening width.

6. The system of claim 1, wherein the nut includes a magnetized portion configured to hold the nut to the strut for assembly.

7. The system of claim 1, wherein the nut includes a recess or a flange for coupling to a spring or a cone for holding the nut to the strut for assembly.

8. A system comprising:
   a nut having a first face and a second face with a hole passing from the first face through the nut to the second face,
      wherein the nut includes a length along the first face and the second face and a width along the first face and the second face, the length being greater than the width,
      wherein the nut includes a first end having a first end surface and a second end having a second end surface at ends of the length, and wherein the nut includes a first side having a first side surface and a second side having a second side surface at ends of the width,
      wherein the nut includes teeth on the first face of the nut, wherein the teeth extend to the first end surface and to the second end surface, wherein the teeth extend the entire width of the first face at the first end and the teeth extend the entire width of the first face of the nut at the second end, and wherein the teeth are configured to engage a flange of a first strut and a second strut,
      wherein the first end surface meets the first side surface at a first rounded corner, and wherein the second end surface meets the second side surface at a second rounded corner, wherein the first rounded corner is opposite the second rounded corner,
      wherein the first side surface meets the second end surface at a third corner adjacent the first rounded corner, wherein the second side surface meets the first end surface at a fourth corner adjacent the second rounded corner, wherein the third corner is opposite the fourth corner, wherein the first strut has a first channel opening to a first channel, wherein the first channel opening has a first opening width and the first channel has a first channel width, wherein the second strut has a second channel opening to a second channel, wherein the second channel opening has a second opening width and the second channel has a second channel width, wherein the first strut and the second strut are different sizes such that the second opening width is greater than the first opening width or the second channel width is greater than the first channel width, wherein the first rounded corner and the second rounded corner allow the nut to be rotated in the first channel of the first strut, and wherein the third corner and the fourth corner disallow further rotation of the nut in the first channel of the first strut, and wherein the nut is configured to receive a bolt and secure a bracket to the first strut and the second strut.

9. The system of claim 8, wherein the first side surface includes a first protrusion at the third corner, wherein the second side surface includes a second protrusion at the fourth corner.

10. The system of claim 8, further comprising:
the first strut; and
the second strut,
wherein the first channel width is one and one-half inches and wherein the second channel width is one and five-eighths inches, or
wherein the second channel width is one-eighth of an inch larger than the first channel width.

11. The system of claim 8,
wherein the first rounded corner and the second rounded corner allow the nut to be rotated in the second channel of the second strut, and wherein the third corner and the fourth corner disallow further rotation in the second channel of the second strut, and
wherein the first strut and the second strut are different sizes such that the second opening width is greater than the first opening width.

12. The system of claim 8, wherein the nut includes a magnetized portion configured to hold the nut to the first strut or the second strut.

13. The system of claim 8, wherein the nut includes a recess or a flange for coupling to a spring or a cone for holding the nut to the first strut or the second strut for assembly.

14. A system comprising:
a nut having a first face and a second face with a hole passing from the first face through the nut to the second face,
wherein the nut includes a length along the first face and the second face and a width along the first face and the second face, the length being greater than the width,
wherein the nut includes a first end surface and a second end surface at ends of the length, and wherein the nut includes a first side surface and a second side surface at ends of the width,
wherein the first end surface meets the first side surface at a first rounded corner, and wherein the second end surface meets the second side surface at a second rounded corner, wherein the first rounded corner is opposite the second rounded corner,
wherein the first side surface meets the second end surface at a third corner adjacent the first rounded corner, wherein the second side surface meets the first end surface at a fourth corner adjacent the second rounded corner, wherein the third corner is opposite the fourth corner,
wherein the first rounded corner and the second rounded corner allow the nut to be rotated in a channel of a strut, and wherein the third corner and the fourth corner disallow further rotation in the channel of the strut, and
wherein the nut includes a magnetized portion to hold the nut to the strut during assembly.

15. The system of claim 14, wherein the magnetized portion of the nut includes a magnet.

16. The system of claim 15, wherein the strut is a first strut, the system further comprising:
the first strut, wherein the first strut has a first channel opening to a first channel, wherein the first channel opening has a first opening width and the first channel has a first channel width and
a second strut having a second channel opening to a second channel, wherein the second channel opening has a second opening width and the second channel has a second channel width,
wherein the second opening width is greater than the first opening width and the second channel width is greater than the first channel width.

17. The system of claim 16, wherein the first rounded corner and the second rounded corner allow the nut to be rotated in the second channel of the second strut, and wherein the third corner and the fourth corner disallow further rotation in the second channel of the second strut.

18. The system of claim 14, wherein the first side surface includes a first protrusion at the third corner, and wherein the second side surface includes a second protrusion at the fourth corner.

19. The system of claim 14, further comprising:
teeth along the first face of the nut, wherein the teeth extend to the first end surface and the second end surface, wherein the teeth are configured to engage a flange of the strut.

20. The system of claim 19, wherein the teeth of the nut extend to an entire length of the first end surface and to an entire length of the second end surface, wherein the teeth are configured to engage a flange of the strut.

* * * * *

UNITED STATES PATENT AND TRADEMARK OFFICE
CERTIFICATE OF CORRECTION

PATENT NO. : 9,103,365 B2  Page 1 of 1
APPLICATION NO. : 13/738600
DATED : August 11, 2015
INVENTOR(S) : Charles E. Whipple and Roger Pyron It is certified that error appears in the above-identified patent and that said Letters Patent is hereby corrected as shown below:

In the Claims
Claim 1, at column 7, line 54 delete the word "disallow"

Signed and Sealed this
Third Day of May, 2016

Michelle K. Lee
*Director of the United States Patent and Trademark Office*